United States Patent
Shi et al.

(10) Patent No.: US 12,478,694 B2
(45) Date of Patent: Nov. 25, 2025

(54) $H_2O_2$-RESPONSIVE CROSSLINKING NEAR-INFRARED MOLECULAR PROBE FOR TUMOR MICROENVIRONMENT AND USE THEREFOR

(71) Applicant: SOOCHOW UNIVERSITY, Suzhou (CN)

(72) Inventors: Haibin Shi, Suzhou (CN); Yinjia Gao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 975 days.

(21) Appl. No.: 17/630,728

(22) PCT Filed: Jul. 27, 2020

(86) PCT No.: PCT/CN2020/104988
§ 371 (c)(1),
(2) Date: Jan. 27, 2022

(87) PCT Pub. No.: WO2021/018099
PCT Pub. Date: Feb. 4, 2021

(65) Prior Publication Data
US 2022/0257798 A1    Aug. 18, 2022

(30) Foreign Application Priority Data
Jul. 30, 2019 (CN) .......................... 201910696937.X

(51) Int. Cl.
*A61K 49/00* (2006.01)
*A61P 35/00* (2006.01)

(52) U.S. Cl.
CPC .......... *A61K 49/0032* (2013.01); *A61P 35/00* (2018.01)

(58) Field of Classification Search
CPC ................ A61K 49/00; A61K 49/0021; A61K 49/0032; A61K 49/0052; A61P 35/00; C09B 23/083; Y02P 20/55; C07F 9/5442; C09K 11/06; C09K 2211/1007; C09K 2211/1014; C09K 2211/1029; C09K 2211/1059
See application file for complete search history.

(56) References Cited

U.S. PATENT DOCUMENTS

| | | |
|---|---|---|
| 2010/0009380 A1 | 1/2010 | Carroll |
| 2015/0119281 A1 | 4/2015 | Hermanson et al. |

FOREIGN PATENT DOCUMENTS

| | | |
|---|---|---|
| CN | 109180680 A | 1/2019 |
| CN | 110407873 A | 11/2019 |
| WO | 2014089546 A1 | 6/2014 |

OTHER PUBLICATIONS

Zhang et al., Theranostic, vol. 7, Issue 15, pp. 3794-3802 (Year: 2017).*
Anirban Chakraborty et al., "Azide-Specific Labeling of Biomolecules by Staudinger-Bertozzi Ligation: Phosphine Derivatives of Fluorescent Probes Suitable for Single-Molecule Fluorescence Spectroscopy" Methods in Enzymology, vol. 472, pp. 19-30 (Dec. 31, 2010).
Leslie B. Poole et al., "Fluorescent and Affinity-Based Tools To Detect Cysteine Sulfenic Acid Formation in Proteins" Bioconjugate Chem. 2007, 18, 2004-2017 (Nov. 21, 2007).
Stephen E. Leonard et al. "Redox-Based Probes for Protein Tyrosine Phosphatases" Angew. Chem. Int. Ed. 2011, 50, 4423-4427 (Apr. 18, 2011).

* cited by examiner

Primary Examiner — D. L. Jones
(74) Attorney, Agent, or Firm — SZDC Law PC

(57) ABSTRACT

The present invention discloses $H_2O_2$ responsive crosslinking NIR molecular probe for tumor microenvironment and application therefor. The preparation method includes the following steps: the amide condensation of 2-propynylamine and Fmoc-Lys(Boc)-OH to obtain compound A01-01; removing protecting groups from compound A01-01, to obtain compound C1-2; reacting compound C1-2 and NHS-activated (3-carboxypropyl)triphenylphosphonium bromide, to obtain compound C1-3; removing protecting groups from compound C1-3, to obtain compound C1-4; reacting compound C1-4 with NHS-activated 3,5-dioxocyclohexane carboxylic acid, to obtain a compound C1-5; and reacting compound C1-5 with NIR dye, to obtain a $H_2O_2$ responsive crosslinking NIR molecular probe for tumor microenvironment. The probe itself uses $H_2O_2$ in a tumor microenvironment for crosslinking on a tumor site, achieving the goal of a long-term retention, thereby improving a result of tumor imaging, and providing a novel strategy and means for improving long-term retention of a NIR molecular probe at a tumor site.

1 Claim, 7 Drawing Sheets

$H_2O_2$-RESPONSIVE CROSSLINKING NEAR-INFRARED MOLECULAR PROBE FOR TUMOR MICROENVIRONMENT AND USE THEREFOR

This application is the National Stage Application of PCT/CN2020/104988, filed on Jul. 27, 2020, which claims priority to Chinese Patent Application No. 201910696937.X, filed on Jul. 30, 2019, which is incorporated by reference for all purposes as if fully set forth herein.

TECHNICAL FIELD

The present invention relates to the technical field of functional modification of NIR dye, and in particular relates to preparation method involving modification of a traditional NIR dye Cy5 with $H_2O_2$ response cross-linked 1,3-cyclohexanedione groups in tumor microenvironment. The molecular probe prepared by this method, and the application of the probe in NIR fluorescence imaging of tumors.

BACKGROUND TECHNIQUE

In the diagnosis of cancer, NIR fluorescent dye detection technology can achieve in-situ, targeted non-invasive dynamic monitoring of cancer. As an NIR fluorescent dye Indocyanine Green (ICG) approved by the Food and Drug Administration (FDA) for clinical diagnosis. A large number of literature reports have designed many NIR fluorescent probes for tumor imaging based on this dye, but they are easily excreted by biological tissues due to their own reasons, resulting in too short residence time in the body, which has a serious impact on the imaging effect of tumors. Therefore, designing a strategy and new method that can stay at the tumor site for a long time is of great significance to improving the imaging effect of the tumor site.

Technical Problem

In order to overcome the above problems, the present invention designs a tumor microenvironment $H_2O_2$ response cross-linked NIR molecular probe. The probe itself uses the $H_2O_2$ in the tumor microenvironment to cross-link at the tumor site to achieve the purpose of long-term retention, thereby improving the effect of tumor imaging. This method is suitable for a variety of NIR dyes and provides a new strategy and means for improving the long-term retention of NIR molecular probes in tumor sites.

Technical Solutions

In order to achieve the above object, the technical scheme adopted by the present invention is, an $H_2O_2$ responsive crosslinking NIR molecular probe for tumor microenvironment, the general structure of which is as shown below:

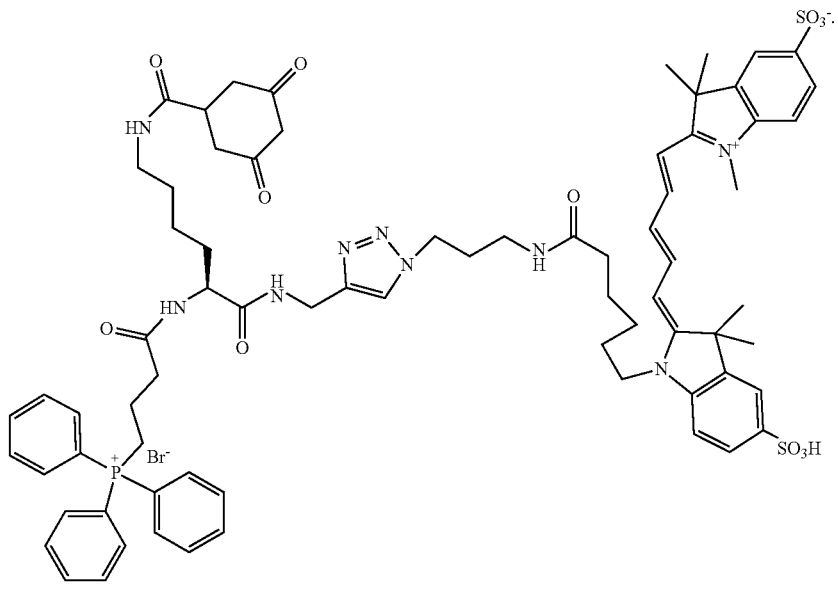

DATC

The application of the above-mentioned $H_2O_2$ responsive crosslinking NIR molecular probe for tumor microenvironment in the preparation of long-term retention probes in tumors.

The application of the above-mentioned $H_2O_2$ responsive crosslinking NIR molecular probe for tumor microenvironment which is the application of in the tumor diagnostic or preparation of therapeutic reagents, preferably, the tumor diagnostic reagent is tumor imaging diagnostic reagent; that is, the application of the above-mentioned $H_2O_2$ responsive crosslinking NIR molecular probe for tumor microenvironment in preparation of tumor imaging reagents.

The method for preparing the $H_2O_2$ responsive crosslinking NIR molecular probe for tumor microenvironment includes the following steps:
  (1) a amide condensation of 2-propynylamine and Fmoc-Lys(Boc)-OH to product compound A01-01;
  (2) removing the protecting group of compound A01-01 to obtain compound C1-2;
  (3) reacting compound C1-2 and (3-carboxypropyl)triphenylphosphonium bromide activated by NHS to obtain compound C1-3;
  (4) removing the protecting group of compound C1-3 to obtain compound C1-4;

(5) reacting compound C1-4 and 3,5-dioxocyclohexanecarboxylic acid activated by NHS to obtain compound C1-5;

(6) reacting compound C1-5 and a NIR dye to obtain an $H_2O_2$ responsive crosslinking NIR molecular probe for tumor microenvironment.

A method for long-term retention of NIR molecular probes in tumors includes the following steps:

(1) a amide condensation of 2-Propynylamine and Fmoc-Lys(Boc)-OH to product compound A01-01;

(2) removing the protecting group of compound A01-01 to obtain compound C1-2;

(3) reacting compound C1-2 and (3-carboxypropyl)triphenylphosphonium bromide activated by NHS to obtain compound C1-3;

(4) removing the protecting group of compound C1-3 to obtain compound C1-4;

(5) reacting compound C1-4 and 3,5-dioxocyclohexanecarboxylic acid activated by NHS to obtain compound C1-5;

(6) reacting compound C1-5 and a NIR dye to obtain a $H_2O_2$ responsive crosslinking NIR molecular probe for tumor microenvironment;

(7) reaching $H_2O_2$ responsive crosslinking NIR molecular probe for tumor microenvironment into the tumor to finish the long-term retention of NIR molecular probe in the tumor.

In the above scheme, the way for $H_2O_2$ responsive crosslinking NIR molecular probe to reach the tumor is non-surgical, such as conventional injection, infusion, and administration; the tumor can be tumor tissue or tumor cells, for example, dissolving $H_2O_2$ responsive crosslinking NIR molecular probe for tumor microenvironment in PBS (phosphate buffer, pH is 7.2 to 7.4) injection (concentration is 100 μM), and the injection reaches the tumor site, and the $H_2O_2$ responsive crosslinking NIR molecular probes for tumor microenvironment are cross-linked inside the tumors. It is achieved the purpose of long-term retention of NIR molecular probes at the tumor site; tumor cells can also be treated with hydrogen peroxide first. And then dissolving DATC in the cell culture medium, adding it to the culture dish of the tumor cells, put it in the incubator. When the molecular probe is treated, cross-linking reaction has happened under the action of hydrogen peroxide between it with the protein and other macromolecules in the tumor cells. Thereby prolonging its residence time in tumor cells, which is conducive to achieving long-term tracking of tumor cells.

In the above scheme, in step (1), the molar ratio of 2-propynylamine to Fmoc-Lys(Boc)-OH is 1.2:1; the amide condensation reaction is carried out in HOBT, HBTU and DIPEA; the amide condensation is at room temperature for 18 to 23 hours.

In the above scheme, in step (2), to remove the deprotection of compound A01-01 is carried out in a piperidine/DCM mixed solution; the volume ratio of piperidine to DCM is 1 to 5; the deprotection is at room temperature.

In the above scheme, in step (3), reacting compound C1-2 with (3-carboxypropyl)triphenylphosphonium bromide activated by NHS in the presence of DIPEA. The molar ratio of compound C1-2 (3-carboxypropyl)triphenylphosphonium bromide and DIPEA is 1 to 1.2 to 1.2; the reaction is at room temperature for 3 to 6 hours.

In the above scheme, in step (4), to remove the deprotection of compound C1-3 is carried out in a TFA/DCM mixed solution; the volume ratio of TFA to DCM is 1 to 4; the deprotection is at room temperature.

In the above scheme, in step (5), reacting compound C1-4 with 3,5-dioxocyclohexanecarboxylic acid activated by NHS in the presence of DIPEA. The molar ratio of compound C1-4, 3,5-dioxocyclohexane carboxylic acid and DIPEA is 1 to 1.2 to 1.2; the reaction is at room temperature for 3 to 6 hours.

In the above scheme, in step (6), the reaction between compound C1-5 and NIR dye is carried out in the presence of sodium ascorbate and copper sulfate; the molar ratio of compound C1-5, NIR dye, sodium ascorbate and copper sulfate is 1.2 to 1 to 2 to 1. The reaction is at room temperature for 8 to 12 hours.

In the present invention, the chemical structural formulas of compound A01-01, compound C1-1, compound C1-2, compound C1-3, compound C1-4, and compound C1-5 are respectively as follows,

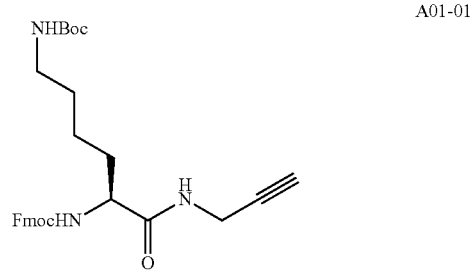

A01-01

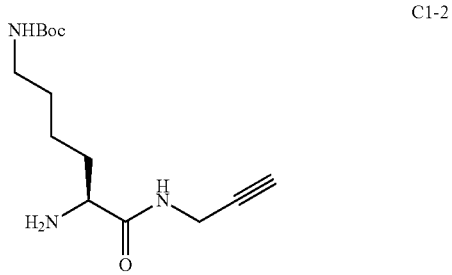

C1-2

-continued

C1-3
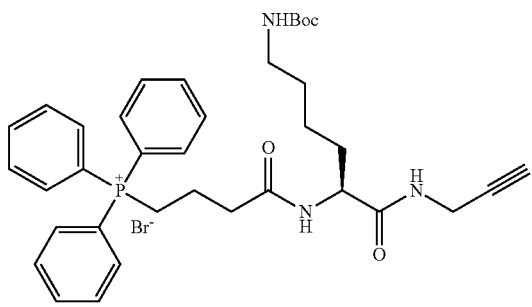

C1-4
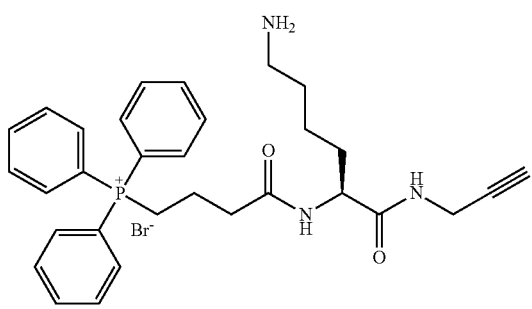

C1-5
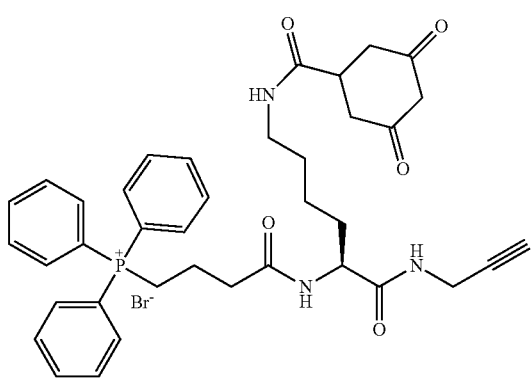

The chemical structure of (3-carboxypropyl)triphenylphosphonium bromide activated by NHS is:

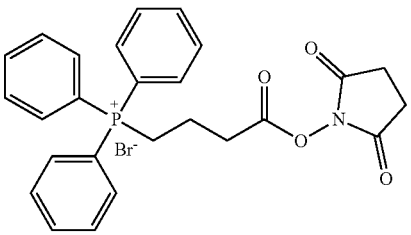

The chemical structural formula of 3,5-dioxocyclohexane carboxylic acid activated by NHS is as follows.

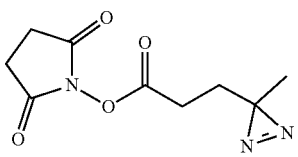 [SMILES: CC1(CCC(=O)ON2C(=O)CCC2=O)N=N1]

The chemical structure of the NIR dye is as follows.

Specifically, the technical solution of the present invention includes the following steps:

(1) Synthesis of $H_2O_2$ Responsive NIR Molecular Probe

First, a amide condensation of 2-propynylamine and Fmoc-Lys(Boc)-OH, and then removing the protective group of the intermediate compound with 20% piperidine/DCM (piperidine:DCM=1:4, v/v); then reacting with (3-carboxypropyl)triphenylphosphonium bromide activated by NHS to obtain the intermediate compound and removing the protective group with 20% TFA/DCM (TFA:DCM=1:4, v/v), and undergoing amidation condensation with 3,5-dioxocyclohexane carboxylic acid activated by NHS. The obtained intermediate compound is further catalyzed by sodium ascorbate and copper sulfate, catalyzed "click" reaction with Cy5 to obtain the final NIR molecular probe DATC, the structure is shown below:

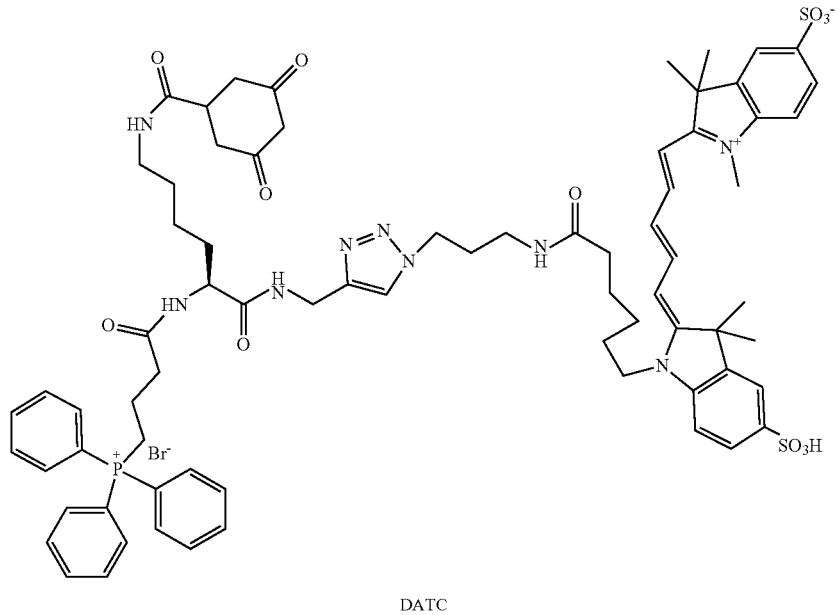

DATC (2) the Cross-Linking Effect of $H_2O_2$ Responsive Crosslinking NIR Molecular Probe DATC in the Cells with Hydrogen Peroxide.

The hydrogen peroxide is diluted to 100 μM with cell culture medium and then added DATC to the culture dish (probe concentration is 5 μM) of 4T1 cells for 15 min washed twice with PBS, incubation for 8 hours. After the probe and 4T1 cell incubation, washing twice with PBS and added fresh medium. During the incubation process of molecular probes, under the action of hydrogen peroxide, it is covalently cross-linked to the endogenous oxidized proteins through the specific and covalent bonding under oxidative stress, resulting in enhanced intracellular uptake and prolonged retention for long-term visualization of tumors.

(3) the Cross-Linking Effect of $H_2O_2$ Responsive NIR Molecular Probe DATC in Tumors.

Dissolving DATC in PBS injection (the probe concentration is 100 μM) and injecting it into the tumor of BALB/c/nu female nude mice bearing 4T1 breast cancer, and then starting to observe the long-term tracking of the molecular probe.

In the present invention, reacting the compound C1-5 and the NIR dye, the conventional semi-preparative high-performance liquid chromatography is used for separation and purifying to obtain the $H_2O_2$ responsive NIR molecular probe DATC, and the product is a dark blue solid powder. The separation method is: C18 column, 3.5 μm, 4.6×100 mm; mobile phase: phase A is trifluoroacetic acid:ultrapure water=1:1000; phase B is trifluoroacetic acid:acetonitrile=1:1000; flow rate is 3 mL/min; linear elution program: 0 min, A:B=95:5; 17 min, A:B=0:100.

The preparation method of the present invention triggers the cross-linking reaction by $H_2O_2$, and extends the residence time of the NIR molecular probe in tumor cells or tumor tissues. It has good fluorescence imaging performance, can perform effective fluorescence imaging of tumors, and overcomes the shortcomings of shallow penetration depth of visible light and no live fluorescence imaging of tumors.

Beneficial Effect

Due to the application of the above technical solutions, the present invention has the following advantages compared with the prior art.

(1) The present invention uses 3,5-dioxocyclohexanecarboxylic acid for the first time to functionally modify the NIR dye $H_2O_2$ with convenient and mild triggering conditions.

(2) $H_2O_2$ responds to the cross-linked NIR molecular probe to generate a photocross-linking reaction under the trigger of the tumor microenvironment without interference from external conditions.

(3) When the probe enters the tumor cell, under the action of $H_2O_2$, 3,5-dioxocyclohexane carboxylic acid will quickly react with the sulfhydryl group on the protein and connect to the protein, and the cross-linking reaction efficiency is higher.

EMBODIMENTS OF THE INVENTION

Figure 1:
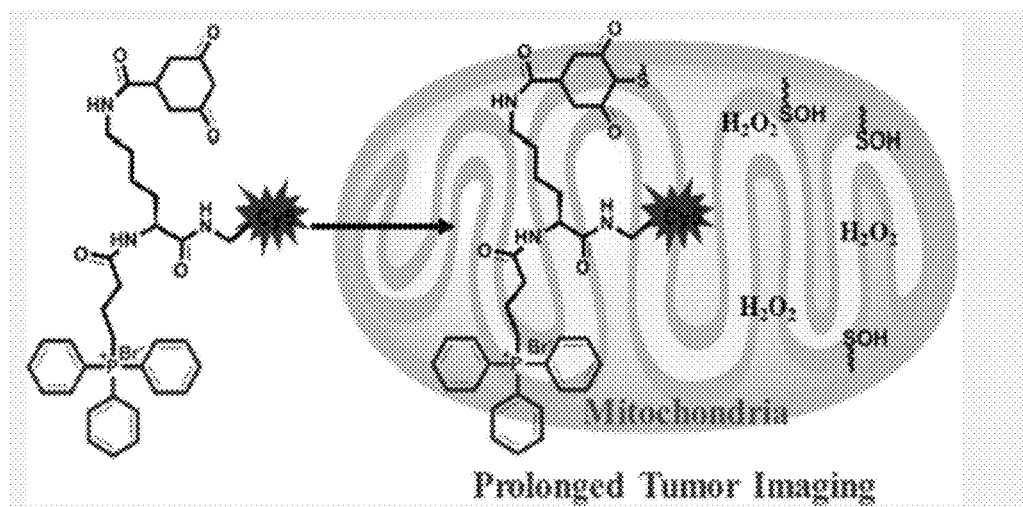
FIG. 1 is a reference diagram of the application of $H_2O_2$ responsive crosslinking NIR molecular probe.

The $H_2O_2$ responsive crosslinking NIR molecular probe DATC in its spectral range. The autofluorescence interference of organisms and tissues to be detected is small, and the tissue penetration depth can reach several centimeters, which is effective to a certain extent Improved the accuracy and sensitivity of imaging; compared with traditional dyes, all aspects of performance have been improved, it has good fluorescence quantum yield, better light resistance, lower biological toxicity, stronger The advantages of fluorescence intensity, plastic molecular structure, better water solubility and low price make it widely used in NIR bioimaging. FIG. 1 is a reference diagram of the application of the $H_2O_2$ responsive crosslinking NIR molecular probe of the present invention.

Hereinafter, the present invention will be further explained with reference to the drawings and specific embodiments. It should be understood that these embodiments are only used to explain and illustrate the technical solutions of the present invention, and are not intended to limit the scope of the present invention. In addition, unless otherwise specified, the materials, reagents, and instruments used in the following examples can all be obtained through commercial means.

Example 1: Synthesis and Characterization of $H_2O_2$ Responsive NIR Molecular Probe DATC and Control Probe TC (1) Dissolved Fmoc-Lys(Boc)-OH (2.34 g, 5 mmol), DMF (30 mL), HBTU (2.28 g, 6 mmol), HOBT (0.81 g, 6 mmol) and DIPEA (1.02 mL, 6 mmol) in a 100 mL round bottom flask at 0° C., and then 2-Propynylamine (330 μL, 6 mmol) was added to the reaction flask stirred for 15 h at room temperature. After that, the solvent was removed by spin evaporation, re-dissolve intermediate products added ethyl acetate (150 mL) followed by. Washing respectively with deionized water (30 mL), saturated $NaHCO_3$ (30 mL) and aqueous sodium chloride (30 mL). Dried with anhydrous sodium chloride and spin-dried to obtain a white powdery intermediate A01-01 (the structure of compound A01-01 is shown in FIG. 2a) (1.90 g, yield is 71%). $^1$H-NMR (400 MHz, Chloroform-d, ppm) δ=7.73 (s, 2H), 7.56 (s, 2H), 7.37 (s, 2H), 7.29 (s, 2H), 4.39 (s, 2H), 4.176-4.126 (m, 2H), 4.00 (s, 2H), 3.07 (s, 2H), 2.96 (s, 1H), 1.65 (s, 2H), 1.66-1.58 (m, 2H), 1.40 (s, 9H), 1.35-1.24 (m, 2H); $^{13}$C-NMR (151 MHz, Chloroform-d, ppm) δ 171.44, 166.24, 143.67, 141.27, 127.72, 127.07, 126.02, 119.97, 79.15, 71.73, 67.04, 64.62, 47.12, 39.77, 31.86, 29.54, 29.17, 28.41, 22.37; MS (MALDI-TOF): Calc'd for: $C_{29}H_{35}N_3O_5([M+Na]^+)$: 528.59, found: 528.34.

(2) Dissolved 8 mL of DCM and 2 mL of piperidine into a 50 mL round bottom flask added intermediate A01-01 (0.5 g, 0.99 mmol) followed by, and stirred for 15 h at room temperature. After that, the solvent was removed by spin evaporation, and purified by silica gel column chromatography (DCM to methanol is 30 to 1, v/v) to obtain a white solid intermediate C1-2 (the structure of compound C1-2 is shown in FIG. 2a) (0.21 g, yield is 75%). $^1$H-NMR (400 MHz, Chloroform-d, ppm) δ 4.01 (s, 2H), 3.35 (t, J=3.2 Hz, 1H), 3.09 (s, 2H), 2.00-1.86 (m, 2H), 1.49-1.45 (m, 2H), 1.40 (s, 9H), 1.28-1.16 (m, 2H); $^{13}$C-NMR (151 MHz, Chloroform-d, ppm) δ 174.63, 156.06, 79.69, 54.81, 40.07, 34.36, 29.82, 28.74, 28.39, 22.71; MS (MALDI-TOF) Calc'd for: $C_{14}H_{25}N_3O_3([M+K]^+)$: 322.46, found: 322.35.

(3) Added DCM 15 mL, (3-carboxypropyl)triphenylphosphonium bromide activated by NHS (0.182 g, 0.424 mmol), intermediate compound C1-2 (0.1 g, 0.353 mmol) and DIPEA (0.2 mL, 0.494 mmol) in a 50 mL round bottom flask at room temperature for 5 hours. After the reaction, the organic phase was washed three times with 20 mL of deionized water, and once with 25 mL of sodium chloride aqueous solution, dried with anhydrous sodium sulfate and spin-dried. Then it was purified by silica gel column chromatography (DCM to methanol is 50 to 1, v/v) to obtain a white solid intermediate C1-3 (the structure of compound C1-3 is shown in FIG. 2a) (0.173 g, yield is 80%). $^1$H-NMR (400 MHz, Chloroform-d, ppm) δ 7.61 (s, 15H), 3.91 (s, 1H), 3.54 (s, 2H), 3.26 (s, 2H), 3.04 (s, 1H), 2.57-2.46 (m, 2H), 2.11 (s, 2H), 1.55-1.44 (m, 2H), 1.28-1.17 (m, 4H), 1.08 (s, 9H), 0.98-0.94 (m, 2H); $^{13}$C-NMR (151 MHz, Chloroform-d, ppm) δ 172.07, 171.24, 155.98, 135.36, 134.01, 133.95, 130.73, 130.64, 119.23, 119.12, 118.67, 118.55, 81.45, 77.77, 73.39, 52.90, 46.03, 42.42, 29.65, 28.69, 28.31, 24.40, 23.23, 18.73, 18.52. MS (MALDI-TOF) Calc'd for: $C_{36}H_{45}N_3O_{4p}^+$ ($[M]^+$): 614.73, found: 614.49.

(4) Added 16 mL of DCM and 4 mL of TFA to a 50 mL round bottom flask, the intermediate compound C1-3 (0.122 g, 0.2 mmol) was added to the reaction flask and stirred at room temperature for 2 hours. After that, the solvent was removed by spin evaporation, and purified by silica gel column chromatography (DCM to methanol is 10 to 1, v/v) to obtain the yellow oily intermediate C1-4 (the structure of compound C1-4 is shown in FIG. 2a) (0.092 g, yield is 90%). $^1$H-NMR (600 MHz, DMSO-d6, ppm) δ 7.83-7.68 (m, 15H), 4.19-4.15 (m, 1H), 3.82-3.77 (m, 2H), 3.54-3.48 (m, 2H), 3.03 (s, 1H), 2.73-2.69 (m, 2H), 2.42-2.32 (m, 2H), 1.72-1.68 (m, 2H), 1.61-1.45 (m, 4H), 1.30-1.19 (m, 2H). $^{13}$C-NMR (151 MHz, DMSO-d6, ppm) δ 171.97, 171.36, 135.34, 134.00, 133.93, 130.71, 130.63, 119.10, 118.54, 117.35, 81.42, 73.35, 52.76, 40.31, 35.21, 35.09, 31.72, 28.34, 27.03, 20.56, 20.22, 18.72; MS (MALDI-TOF) Calc'd for: $C_{31}H_{37}N_3O_2P^+$ ($[M]^+$): 514.62, found: 514.41.

(5) Added 10 mL of N,N-dimethylformamide, intermediate compound C1-4 (0.055 g, 0.107 mmol), 3,5-dioxocyclohexanecarboxylic acid (20 mg, 0.128 mmol) and DIPEA (25.5 μL, 0.154 mmol) in a 50 mL round bottom flask reacted at room temperature for 6 hours. After the reaction, the solution was removed by rotary evaporation and purified by silica gel column chromatography (DCM to methanol is 10 to 1, v/v) to obtain a yellow oily intermediate compound C1-5 (the structure of compound C1-5 is shown in FIG. 2a) (0.056 mg, yield is 81%). $^1$H-NMR (600 MHz, DMSO-d6, ppm) δ 7.88-7.71 (m, 15H), 4.16 (td, J=8.4, 5.4 Hz, 1H), 3.80-3.79 (m, 2H), 3.51-3.47 (m, 2H), 3.03 (t, J=2.4 Hz, 0H), 2.99-2.95 (m, 2H), 2.80 (td, J=11.3, 5.6 Hz, 1H), 2.41-2.30 (m, 4H), 2.23 (dd, J=16.9, 4.7 Hz, 2H), 1.73-1.66 (m, 2H), 1.56 (dt, J=14.8, 5.7 Hz, 1H), 1.49-1.43 (m, 1H), 1.36-1.28 (m, 2H), 1.28-1.03 (m, 4H); $^{13}$C-NMR (151 MHz, DMSO-d6) δ 172.44, 172.07, 171.29, 135.35, 134.00, 133.93, 130.72, 130.64, 119.10, 118.53, 81.45, 73.37, 52.83, 29.08, 28.31, 25.64, 23.17, 20.54, 20.20, 18.70; MS (MALDI-TOF) Calc'd for: $C_{38}H_{43}N_3O_5P^+$ ([M]$^+$): 652.74, found: 652.26.

(6) Added 1 mL of DMSO, intermediate compound C1-5 (2.66 mg, 0.0041 mmol) and NIR dye (2.68 mg, 0.0037 mmol, structural formula shown in FIG. 3) into a 5 mL round bottom flask, stirred well. At the same time, sodium ascorbate (8.1 mg, 0.0409 mmol) and anhydrous copper sulfate (5.1 mg, 0.0204 mmol) were mixed and dissolved in 1 mL of deionized water, and then the mixture was added to the reaction flask and stirred at room temperature for 10 hours. After that, purification via high performance liquid chromatography (HPLC) to afford the desired probe DATC (the separation method is, C18 column, 3.5 μm, 4.6×100 mm; mobile phase: phase A is TFA to ultrapure water is 1 to 1000; phase B is TFA to acetonitrile is 1 to 1000; flow rate is 3 mL/min; linear elution program, 0 min, A to B is 95 to 5; 17 min, A to B is 0 to 100), the molecular probe DATC (The dark blue solid powder is 4.51 mg, yield is 91%). $^1$-NMR (600 MHz, DMSO-d6, ppm) δ 8.40-8.52 (m, 1H), 8.09 (d, J=7.9 Hz, 1H), 7.86 (d, J=7.9 Hz, 3H), 7.80-7.71 (m, 15H), 7.32-7.23 (m, 1H), 6.37 6.17 (m, 1H), 4.30-4.13 (m, 4H), 4.12-4.03 (m, 3H), 3.53-3.47 (m, 4H), 3.39-3.33 (m, 1H), 3.28 (t, J=6.7 Hz, 1H), 3.04 (s, 1H), 3.03-2.86 (m, 5H), 2.77-2.70 (m, 1H), 2.48-2.47 (m, 6H), 2.42-2.26 (m, 5H), 2.04-1.97 (m, 1H), 1.81-1.74 (m, 1H), 1.74-1.68 (m, 3H), 1.67-1.61 (m, 6H), 1.59-1.54 (m, 2H), 1.52-1.39 (m, 3H), 1.38-1.28 (m, 3H), 1.25-1.14 (m, 5H). $^{13}$C-NMR (400 MHz, DMSO) δ 172.46, 172.10, 171.31, 162.79, 158.80, 158.45, 135.40, 134.08, 133.98, 130.80, 130.67, 119.29, 118.44, 81.50, 73.46, 52.84, 49.40, 48.87, 47.57, 36.25, 35.29, 32.06, 30.44, 29.08, 28.34, 27.52, 27.41, 27.16, 25.32, 23.22, 20.64, 20.12, 18.74, 12.57. MS (ESI): m/z Calc'd for: $C_{73}H_{88}N_9O_{12}P^+S_2^{2+}$ ([M+TFA+2Cl]$^-$): 1562.57; found, 1562.0.

(7) Added 1 mL of DMSO, intermediate compound C1-3 (4.67 mg, 0.0076 mmol) and NIR dye (5.00 mg, 0.0069 mmol) into a 5 mL round bottom flask, and stir well. At the same time, sodium ascorbate (13.67 mg, 0.069 mmol) and anhydrous copper sulfate (8.61 mg, 0.0345 mmol) were mixed and dissolved in 1 mL of deionized water, and then the mixture was added to the reaction flask and stirred at room temperature for 5 hours. After that, purification via high performance liquid chromatography (HPLC) to afford the desired probe DATC (the separation method is, C18 column, 3.5 μm, 4.6×100 mm; mobile phase: phase A is TFA to ultrapure water is 1 to 1000; phase B is TFA to acetonitrile is 1 to 1000; flow rate is 3 mL/min; linear elution program, 0 min, A to B is 95 to 5; 17 min, A to B is 0 to 100), the control molecular probe TC (dark blue solid powder is 8.6 mg, yield is 93%). $^1$H-NMR (600 MHz, DMSO-d6) δ8.40 (t, J=6.0 Hz, 1H), 8.08 (d, J=7.9 Hz, 1H), 7.85 (d, J=5.1 Hz, 3H), 7.79-7.72 (m, 15H), 7.30-7.64 (m, 1H), 6.71 (s, 1H), 6.54 (t, J=12.0 Hz, 2H), 6.27 (dd, J=13.8, 5.5 Hz, 2H), 4.31-4.21 (m, 5H), 4.21-4.14 (m, 2H), 4.12-4.05 (m, 4H), 2.93 (d, J=6.0 Hz, 2H), 2.80 (d, J=6.8 Hz, 2H), 2.38-2.33 (m, 2H), 2.01 (t, J=7.1 Hz, 2H), 1.80-1.76 (m, 2H), 1.64 (d, J=5.1 Hz, 12H), 1.54-1.40 (m, 6H), 1.31 (s, 9H), 1.27 (s, 4H), 1.24-1.21 (m, 8H). $^{13}$C-NMR (400 MHz, DMSO-d$_6$) δ 173.42, 173.15, 172.45, 172.28, 171.36, 158.40, 156.02, 145.85, 145.07, 142.53, 141.94, 141.11, 135.41, 134.07, 133.97, 130.78, 130.66, 123.29, 120.42, 119.30, 118.44, 77.82, 49.40, 49.33, 47.56, 36.11, 35.47, 32.13, 30.46, 29.48, 28.72, 27.52, 27.41, 26.07, 25.31, 23.31, 18.79, 12.57.

The chemical structure of the NIR dye is as follows:

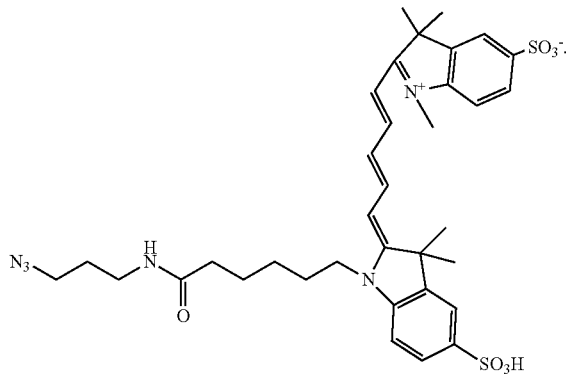

Figure 2:
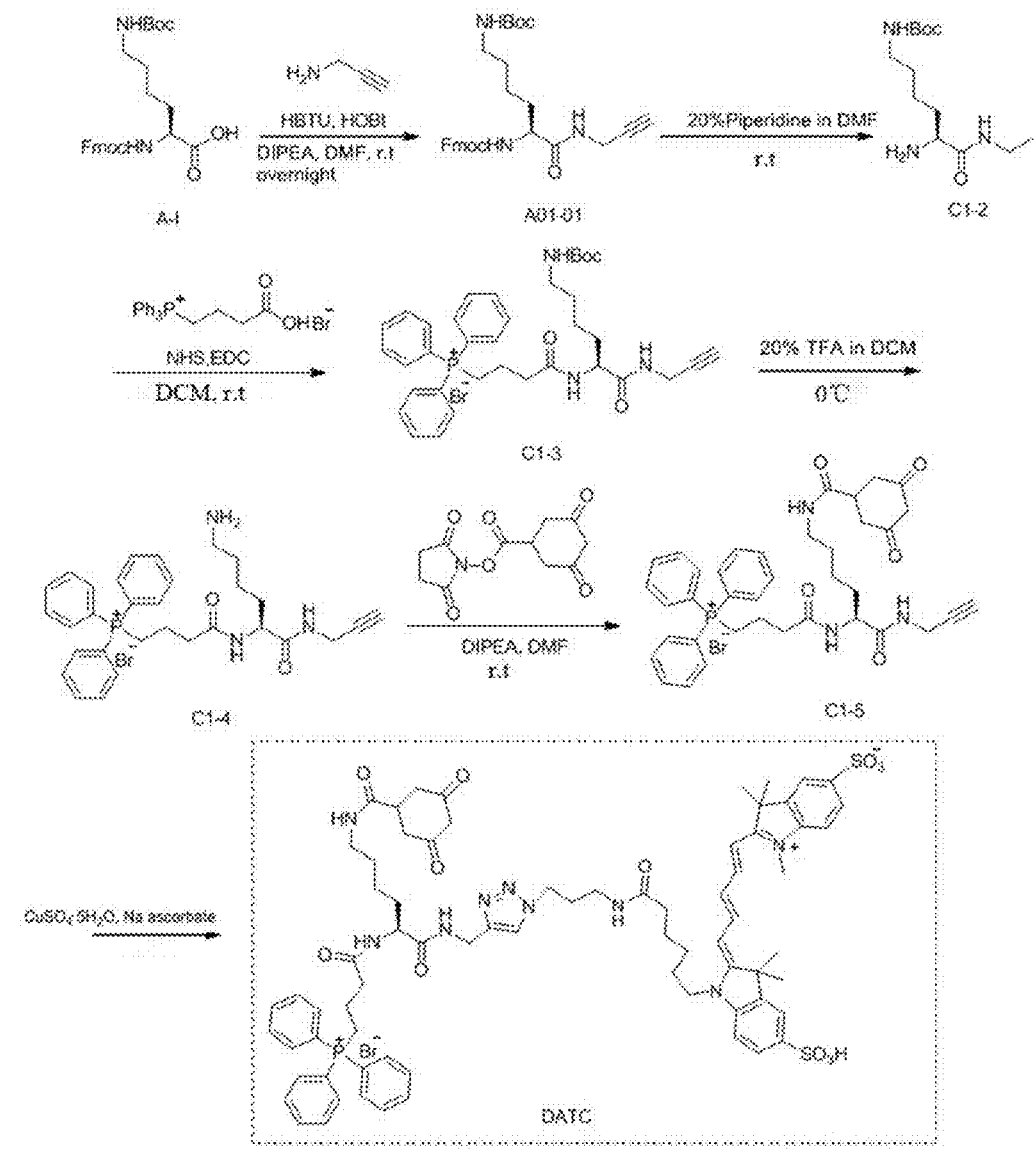
FIG. 2 is a preparation flow chart of $H_2O_2$ responsive crosslinking NIR molecular probe DATC.
Figure 3:
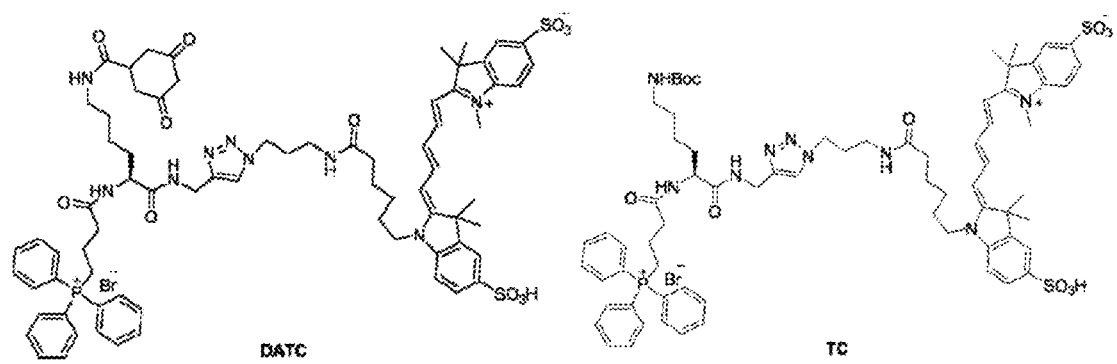
FIG. 3 is the chemical structure formula of DATC and TC.

FIG. 2 is a flow chart of the above-mentioned preparation of DATC, and FIG. 3 is the chemical structure formula of DATC and TC.

Figure 8:
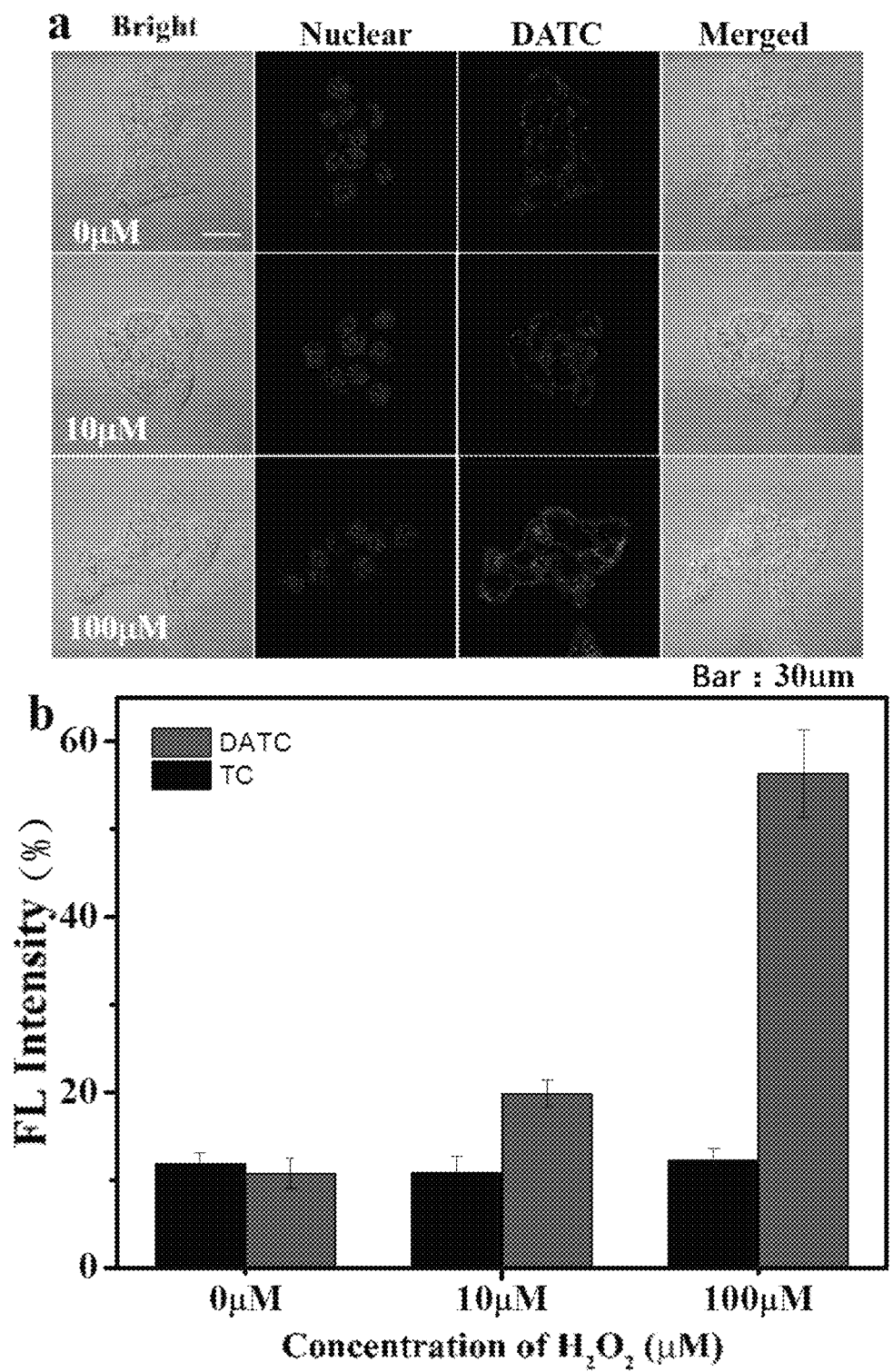
FIG. 8 is a fluorescence photograph (a) and corresponding standard fluorescence intensity diagram (b) of the intracellular probe (concentration of 5 μM) after 4T1 cells are treated with the same concentration of hydrogen peroxide.

Example 2: Cross-Linking of $H_2O_2$ Responsive NIR Molecular Probe DATC Under the Action of Hydrogen Peroxide The 4T1 cells were first treated with 100 μM hydrogen peroxide for 15 min, and then the $H_2O_2$ responsive NIR molecular probe DATC prepared in Example 1 was diluted into the cell culture medium, and then added to the 4T1 cell culture dish and incubated (The probe concentration is 5 μM). The sulfhydryl group on the protein in 4T1 cells treated with hydrogen oxide will be oxidized to sulfenic acid. When the probe entered into the tumor cell, the group 3,5-dioxocyclohexane carboxylic acid will interact with sulfenic acid cross-linking forms a CS covalent bond, so that the probe molecule is firmly connected to the macromolecular protein in the tumor cell, thereby prolonging the residence time of the molecular probe in the tumor cell, and improving the imaging effect of the probe molecule. The technical effect is shown in the FIG. 8.

Example 3: $H_2O_2$ Responsive NIR Molecular Probe DATC was Characterized by HPLC and MS After the $H_2O_2$ responsive NIR molecular probe prepared in Example 1 was diluted with solvent methanol to a concentration of 5 μM, the molecular weight was determined by MS, and its purity was analyzed by HPLC.

Figure 4:
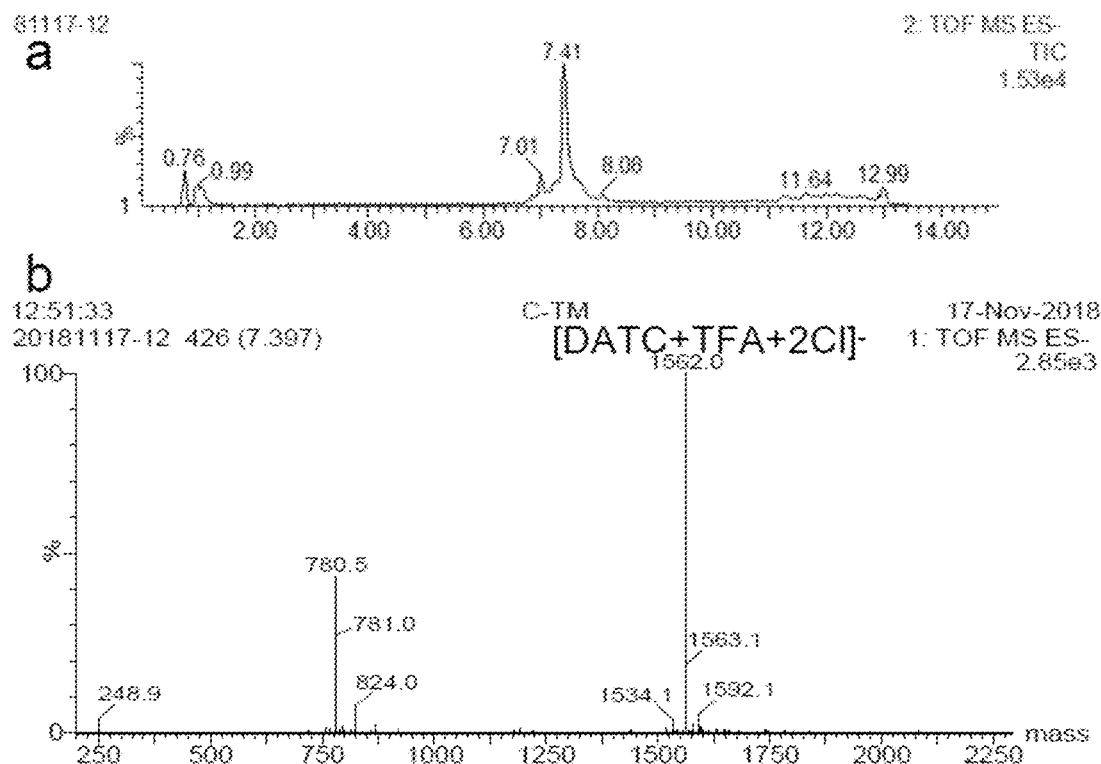
FIG. 4 shows the purity characterization (a) and mass spectrometry (b) of the $H_2O_2$ responsive crosslinking NIR molecular probe DATC.

As shown in FIG. 4a, the sample analyzed by an Agilent 1260 high performance liquid chromatograph. The retention time of the probe DATC was for 5.260 minutes. The sub-area was further integrated, and the probe concentration in the sample was calculated to be as high as 98%. FIG. 4b shows the theoretical m/z of the probe DATC is 1378.64, and the actual mass spectrum m/z ([M+TFA+2Cl]−) is 1562.0, which is consistent with each other, is the desired compound.

Example 4: the Ultraviolet Absorption Spectrum and Fluorescence Spectrum of the $H_2O_2$ Responsive NIR Molecular Probe DATC and the Toxicity of the Probe After diluting the $H_2O_2$ responsive NIR molecular probe prepared in Example 1 with methanol to a concentration of 1 µM, an ultraviolet-visible absorption spectrometer and a steady-state/transient fluorescence spectrometer were used to measure the ultraviolet absorption spectrum and fluorescence of the probe. Spectrum: The cytotoxicity of the probe to 4T1 was investigated by MTT (thiazole blue) colorimetry.

Figure 5:
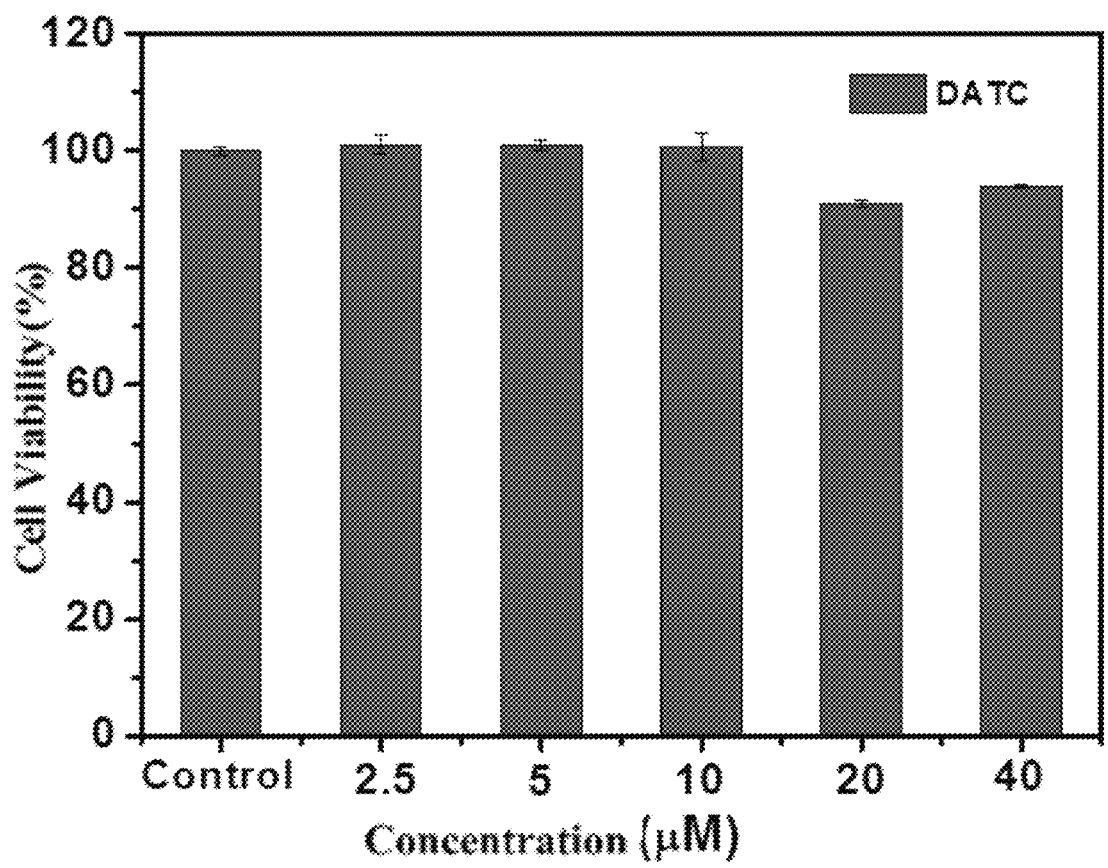
FIG. 5 shows the UV absorption spectrum and fluorescence absorption spectrum of the $H_2O_2$ responsive crosslinking NIR molecular probe DATC (a) and the cytotoxicity of the probe (b).

As shown in FIG. 5a, it is found through the ultraviolet absorption spectrum that there are two obvious absorption peaks in the range from 630 nm to 660 nm of the probe DATC, and the max absorption peak is at 646 nm; through the fluorescence spectrum, it is found that there is an emission peak in the range from 665 nm to 690 nm of the probe DATC and its maximum emission is at 670 nm.

FIG. 5b is the cytotoxicity test of the molecular probe DATC. The survival rate of the cells basically does not depend on the probe concentration. As the concentration increases, the probe has no killing effect on the cells. When the concentration of the molecular probe DACF is 40 µM, the cell survival rate is still more than 90%, which is much higher than the concentration of the probe used in clinical practice.

Example 5: the Case where Probes of Different Concentrations are Incubated with 4T1 Cells at the Same Time Based on the method described in Example 2, the 4T1 cells were seeded in a confocal small dish with $1.5 \times 10^4$ cells per well, placed in an incubator for 24 hours, and then the culture medium was discarded. The $H_2O_2$ responsive NIR molecular probe prepared in Example 1 was diluted with culture medium to concentrations of 1 µM, 2 µM, and 5 µM, and then added to a 4T1 cell culture dish, and placed in a cell incubator to incubate for 2 hours. After the probe and 4T1 cell incubation time is over, stain the nucleus with Hoechst 33342 staining solution, and observe the fluorescence of different concentrations of probe in 4T1 cells within the same time using a confocal microscope.

Figure 6:
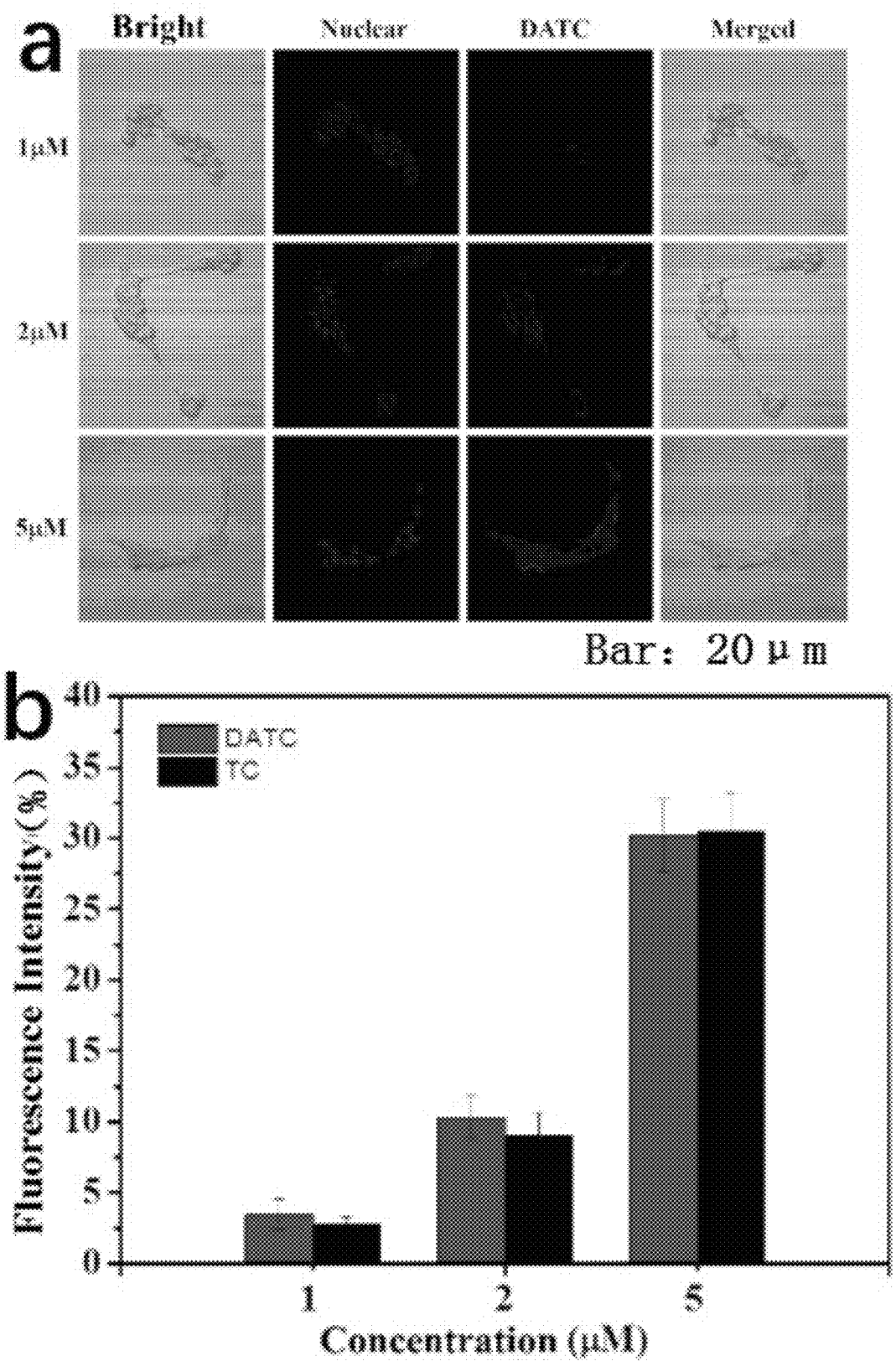
FIG. 6 is a fluorescence photograph (a) and a corresponding standard fluorescence intensity diagram (b) of the different concentrations of probes of the present invention incubated with 4T1 cells for the same time.

As shown in FIG. 6a, under the same conditions, the red fluorescence intensity of different concentrations of probes in 4T1 cells is different. The 5 µM concentration probe has the strongest fluorescence intensity, while there are not much different the fluorescence intensity at 1 µM and 2 µM concentration probes in 4T1 cells. Therefore, the working concentration of the probe is selected as 5 µM in the subsequent experiments.

Figure 7:
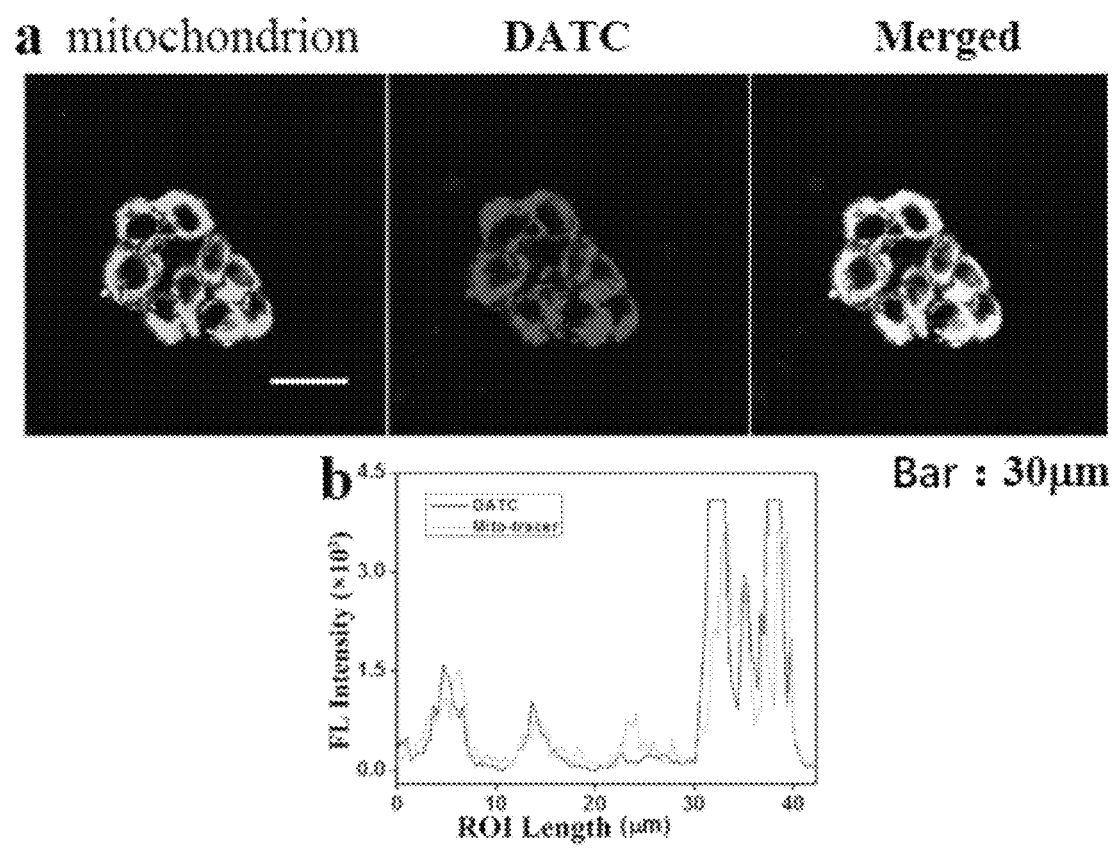
FIG. 7 shows the co-localization of the intracellular probe (with a concentration of 5 μM) and the intracellular mitochondria.

Example 6: Co-Localization of Intracellular Probes (with a Concentration of 5 µM) and Intracellular Mitochondria Based on the method described in Example 2, 4T1 cells were seeded in a confocal small dish with $1.5 \times 10^4$ cells per well, placed in an incubator for 24 hours, and then the culture medium was discarded. The $H_2O_2$ responsive NIR molecular probe prepared in Example 1 was diluted with a culture medium to a concentration of 5 µM, and then added to a 4T1 cell culture dish, and placed in a cell incubator to incubate for 12 hours. After the probe and 4T1 cell incubation time was over, the cells were incubated with mitochondrial dye and Hoechst 33342 respectively, and the co-localization of the probe with mitochondria in 4T1 cells at the same time was observed using a confocal microscope. As shown in FIG. 7, the probe DATC and mitochondrial fluorescence basically coincide.

Example 7

After treating 4T1 cells with the same concentration of hydrogen peroxide, the retention of the probe in the cells.

Based on the method described in Example 2, 4T1 cells were seeded in a confocal small dish, $1.5 \times 10^4$ cells per well, and placed in an incubator for 24 hours. After diluting hydrogen peroxide to 100 µM with cell culture medium, it was added to a culture dish of 4T1 cells and incubated for 15 minutes, and then the culture medium was discarded. The $H_2O_2$ responsive NIR molecular probe prepared in Example 1 was diluted with a culture medium to a concentration of 5 µM, and then added to the 4T1 cell culture dish, and placed in a cell incubator for 8 hours. After incubation of the probe and 4T1 cell, added new cell culture medium and continue culturing in the incubator for 4h, 8h, 12h and 24h. Then stained the nucleus with Hoechst33342 dye solution, and observed the fluorescence in 4T1 cells at different times after hydrogen peroxide treatment with a laser confocal microscope. The fluorescent probe (TC) without 3,5-dioxocyclohexane carboxylic acid was used as a control example, and a unified experimental method was adopted.

As shown in FIG. 8a, the red fluorescence intensity in the 4T1 cells is the same at the beginning 0h. After washing off the probe for 8 hours, the red fluorescence intensity in 4T1 cells was significantly stronger than that of the probe without cross-linking group in the control group. And with the extension of time, the fluorescence of the control group without cross-linking group decreased very rapidly. For 12h later, the fluorescence signal of the control group was weak; for 24h later, the experimental group could still observe a strong fluorescence signal, while the control group had almost no fluorescence signal.

FIG. 8b is the corresponding fluorescence quantitative data. The probe with the cross-linking group can stay in the cell for 24 hours at least, while the probe without the cross-linking group only lasts about 12 hours. Therefore, the $H_2O_2$ responsive NIR molecular probe DATC can be used for cell tracking.

Example 8

After the 4T1 cells were treated with the same concentration of hydrogen peroxide, the probes DATC and TC were incubated with the 4T1 cells for the same time, and after re-culturing for 12 hours, the immunofluorescence of the probes in the cells.

Based on the method described in Example 2, 4T1 cells were seeded in a confocal small dish, $1.5 \times 10^4$ cells per well, and placed in an incubator for 24 hours. After diluting hydrogen peroxide to 100 µM with cell culture medium, it was added to a culture dish of 4T1 cells and incubated for 15 minutes, and then the culture medium was discarded. The $H_2O_2$ responsive NIR molecular probe prepared in Example 1 was diluted with a culture medium to a concentration of 5 µM, and then added to a 4T1 cell culture dish, and placed in a cell incubator for 8 hours. After the incubation time of the probe and 4T1 cells is over, add new cell culture medium and continue culturing in the incubator for 12 hours. Subsequently, the cells were fixed with 4% paraformaldehyde at room temperature for 15 minutes, and then washed with PBS; secondly, 0.5% Trition-100 and 4T1 cells were incubated at room temperature for 5 minutes; the antibody anticysteine sulfenic acid was incubated at room temperature. After 1 hour, the antibody was washed with PBS, and then incubated at 37° C. for 30 minutes with goat anti-rabbit-Cy3. Finally, the nucleus was stained with Hoechst 33342 staining solution. The immunofluorescence in 4T1 cells was observed with a laser confocal microscope after hydrogen peroxide treatment. The fluorescent probe (TC) without 3,5-dioxocyclohexane carboxylic acid was used as a control, and a unified experimental method was adopted.

Figure 9:
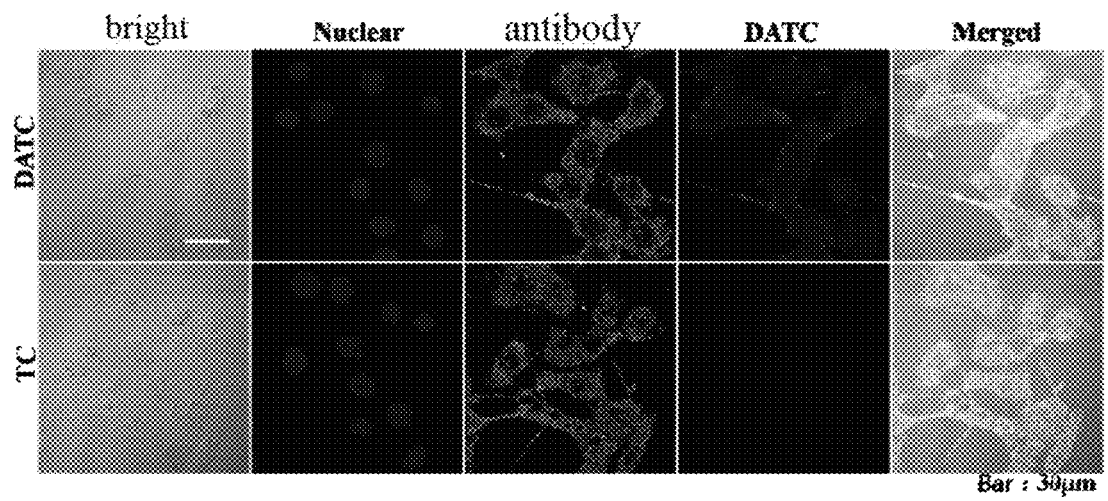
FIG. 9 is an immunofluorescence photograph of the probes in the cells after the 4T1 cells are treated with the same concentration of hydrogen peroxide, the probes DATC and TC are incubated with the 4T1 cells for the same time, and after re-cultivation for 12 hours.

As shown in FIG. 9, after two groups of cells were treated, protein sulfenic acid was formed in the cells. The content of probe DATC in cells is relatively high, while the fluorescent signal of probe TC is basically not observed. The experimental results prove that DATC can achieve long-term retention in tumors.

Example 9: NIR Fluorescence Imaging of the $H_2O_2$ Responsive NIR Molecular Probe DATC at the Tumor Site in Mice BALB/c/nu female nude mice inoculated with 4T1 mouse breast cancer cells were randomly divided into two groups with 5 mice in each group. After the tumor on the right forelimb of the mouse grows up, the probes DATC and TC are injected into the tumors of the two groups of nude mice by intratumoral injection, at a concentration of 100 μM (50 μL/each). Then put the probe-injected mice in the small animal IVIS Lumina XRMS live imaging system to observe the changes in the fluorescence intensity of the probe in the nude mouse tumor over time, and calculate the experimental group probe and the control group through the IVIS live imaging analysis software The fluorescence intensity of the probe at different time points at the tumor site in nude mice.

Figure 10:
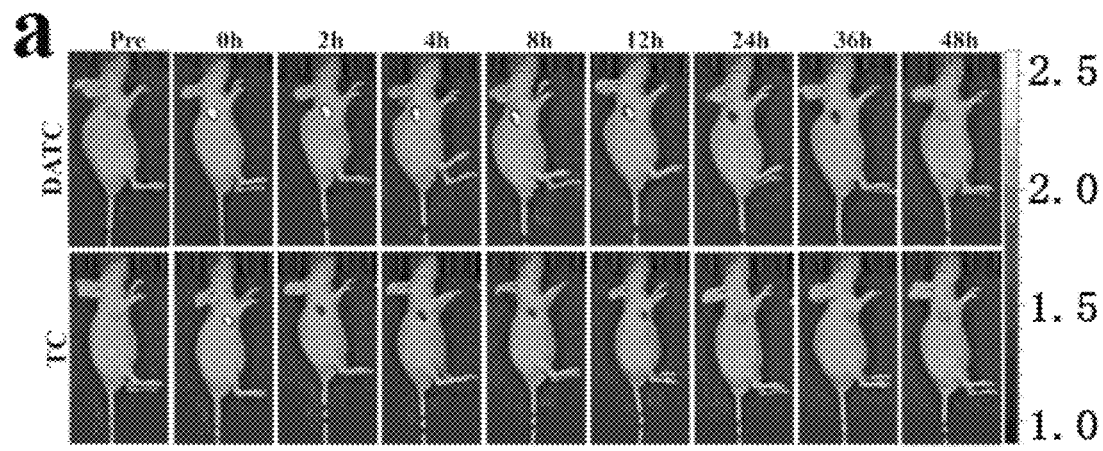
FIG. 10 shows the NIR fluorescence photos (a) and corresponding standard fluorescence intensity diagrams (b) of the mouse tumor site at different times after the probe is injected into the tumor.
Figure 10:
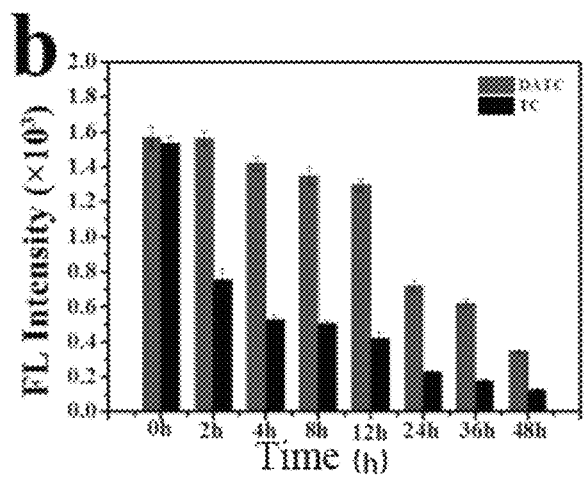

As shown in FIG. 10a, just after the probe was injected into the tumor, the fluorescence signal intensity of the probe at the tumor site of the experimental group and the control group were basically the same. After that, with the extension of time, the probe was gradually metabolized in the tumor-bearing mice. The signal of the probe in the control group was significantly weakened at 2h, while the experimental group only slightly decreased. At 12h, the experimental group probe still had obvious fluorescence signal, while the control group had very weak fluorescence signal. Through the fluorescence signal statistics of the tumor site in FIG. 10b, it can be clearly seen that the fluorescent signal of the tumor site in the experimental group can last for 36 hours. The results of in vivo fluorescence imaging proved that the photocrosslinking probe of the present invention can perform photocrosslinking reaction at the tumor site, crosslinking in the tumor, reducing cell metabolism efflux, and allowing the probe to stay in the tumor site for a long time, thereby prolonging Fluorescence imaging time.

The application of $H_2O_2$ responsive NIR molecular probe has achieved remarkable development. In order to overcome the shortcomings of traditional NIR molecular probes, the present invention constructs a $H_2O_2$ responsive NIR molecular probe to increase the concentration of the probe at the tumor site and prolong its residence time, thereby effectively improving tumor imaging effect. It has the following advantages: first, its triggering conditions are simple; second, the cross-linking reaction is affected by $H_2O_2$ at the tumor site, and the pH of the tumor site basically has no effect on the cross-linking reaction; third, when the probe enters the tumor cell under the influence of internal $H_2O_2$, it will quickly cross-link with the protein containing sulfhydryl groups at the tumor site to achieve the purpose of long-term retention. Therefore, NIR molecular probes have further applications in biology and other fields.

The invention claimed is:

1. An $H_2O_2$ responsive crosslinking NIR molecular probe for tumor microenvironment, comprising a compound having following chemical structure:

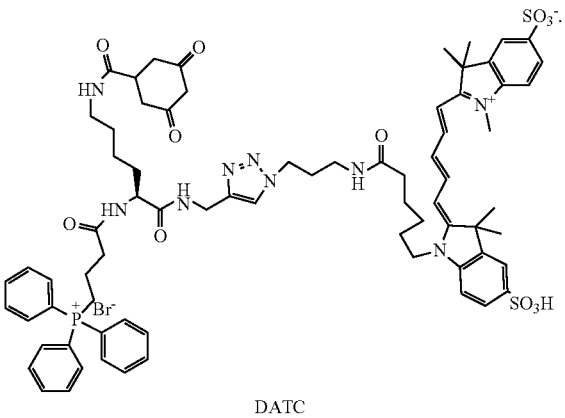

DATC

* * * * *